United States Patent [19]

Psencik

[11] 4,113,702

[45] Sep. 12, 1978

[54] METHOD OF PREPARING POLYESTER VARNISH RESINS OF LOW VISCOSITY

[75] Inventor: Erich Psencik, Witten-Bommern, Fed. Rep. of Germany

[73] Assignee: Dynamit Nobel Aktiengesellschaft, Troisdorf, Fed. Rep. of Germany

[21] Appl. No.: 598,084

[22] Filed: Jul. 22, 1975

[30] Foreign Application Priority Data

Jul. 27, 1974 [DE] Fed. Rep. of Germany ....... 2436371

[51] Int. Cl.$^2$ .............................................. C08G 63/76
[52] U.S. Cl. ...................................... 528/75; 260/867;
528/80; 528/273; 528/288; 528/289; 528/297; 528/300
[58] Field of Search ........ 260/75 EP, 75 UA, 30.4 R, 260/867

[56] References Cited

U.S. PATENT DOCUMENTS

| | | | |
|---|---|---|---|
| 1,845,198 | 2/1932 | Schmidt et al. ................. | 260/75 EP |
| 3,178,454 | 4/1965 | Kloos et al. ................. | 260/75 EP X |
| 3,249,653 | 5/1966 | van Amerangen et al. .... | 260/75 EP X |
| 3,268,462 | 8/1966 | Bruin et al. ..................... | 260/30.4 X |
| 3,370,043 | 2/1968 | Milligan .......................... | 260/75 EP |
| 3,402,139 | 9/1968 | Mont et al. ......................... | 260/30.4 |
| 3,641,201 | 2/1972 | Heilman ............................... | 260/867 |

*Primary Examiner*—Sandra M. Person
*Attorney, Agent, or Firm*—Burgess, Dinklage & Sprung

[57] ABSTRACT

A process for the preparation of a varnish resin having a viscosity of 1000 to 4000 cP, an acid number from 0 to 1 and an OH number between 100 and 250, useful in the absence of a solvent, by a two-step process involving condensation of a polycarboxylic acid or anhydride with a polyalcohol in a first step until there is obtained an intermediate resin whose acid number is between 10 and 80 and whose viscosity is between 30,000 and 180,000 cP and wherein in the second step there is added to the resultant resin from the first step a glycidyl ester of a saturated aliphatic carboxylic acid and the same is condensed with the resultant resin at a temperature of 110 to 150° C until the acid number of the resin is between 0 and 1 and the resin has a viscosity between 1000 and 4000 cP.

18 Claims, No Drawings

METHOD OF PREPARING POLYESTER VARNISH RESINS OF LOW VISCOSITY

BACKGROUND OF THE INVENTION

1. Field of the Invention

This invention relates to a process for the preparation of a varnish resin of low viscosity. More especially, this invention relates to the preparation of a varnish resin which can be used in the absence of a solvent, to varnishes containing such a resin and to a process for the preparation of such varnish resin. This invention is also directed to a two-component varnish comprising the varnish resin of the invention and a second component. This invention is particularly concerned with the preparation of a polyester varnish which, subsequent to crosslinking, provides a varnish film at least equal in quality, and preferably superior, to known polyester varnishes which are hardened with amines or isocyanates and which have heretofore been applied to substrates only by the use of solvents.

DISCUSSION OF THE PRIOR ART

The use of polyesters in varnish compositions has been known. Polyesters heretofore employed as binding agents in varnish systems have had a certain molecular size in order to provide a useful film following the crosslinking of the components. The molecular size which these heretofore known polyesters have had has been expressed in terms of viscosity and acid number. The known solvent-free polyesters heretofore provided have had a relatively high viscosity on the order of 80,000 to 150,000 cP determined at 20° C with an acid number between 5 and 30.

The use of these resins in varnish systems has presented a number of problems. These resins have required the use of solvents to dilute them to a consistency where they could be disposed onto a substrate by known methods of application, e.g., spraying, brushing, dipping and rolling. To accomplish this, solvents have been added to adjust the viscosity of the mass to 100 to 300 cP. In general, so much solvent has been required that the content of the resin (plus any pigment) in the varnish composition has been between 30 and 60% by weight only. Obviously, such a varnish suffers when the solvent is removed following its application to the substrate in that a substantial amount of the varnish composition is lost due to evaporation.

By providing such varnish systems having a solvent, problems have been encountered in the method of operation. The solvent must be removed after the varnish has been applied. This additional step requires either a great deal of time, if the solvent evaporation is to take place at room temperature, or an additional expenditure of energy so as to drive off the solvent by heat input.

The driving off of the solvent has the additional disadvantage that it highly contaminates the air in surrounding environment, especially in paint shops, so that still additional apparatuses or equipment must be installed for the purpose of recovering and/or destroying these solvents. The solvents, of course, have themselves required an additional expenditure of money for their purchase.

It therefore became desirable to provide a polyester varnish resin having a low viscosity, say on the order of 1000 to 4000 cP, an acid number smaller than 1 and a hydroxyl number of about 100 to 250 and which could be applied to a surface to be varnished without the use of a solvent. It was additionally desired to provide a varnish which, after the addition of isocyanate and/or amine resins, provided a varnish system which, when applied by known spraying, dipping, rolling or electrostatic methods, would provide an oven dried film in a bake-on time of the order of 1 to 40 minutes employing temperatures of 100° to 250° C. These resins, it was desired, should be stable in storage, i.e., should upon storage at normal temperature or at 4° C, not acquire any higher viscosity or develop any turbidity for a period of at least six months.

SUMMARY OF THE INVENTION

The long-felt desideratum in the art is answered, in accordance with the invention, by a process for preparing a varnish resin having a viscosity of 1000 to 4000 cP, an acid number from 0 to 1 and a hydroxyl number between 100 and 250, which process comprises:

A. Condensing a polycarboxylic acid or anhydride with a polyalcohol until a resin is formed having an acid number between 10 and 80 and a viscosity between 30000 and 180000 cP; and B. Thereafter adding to the resultant resin a glycidyl ester of a saturated aliphatic carboxylic acid having 10 to 30 carbon atoms and condensing the glycidyl ester with the resin from step A at a temperature of 110° to 150° C until the acid number of the resin is between 0 and 1, and the resin has a viscosity number of 1000 to 4000 cP.

Preferably, the process is carried out such that the temperature in step A is between 50° and 260° C. Following step A, the temperature of the resultant resin is adjusted so that it lies within the range 80° to 100° C. As soon as the desired temperature within this range is reached, the glycidyl ester is added and the reaction is continued.

By carrying out such a process there is provided the desired varnish resin of viscosity 1000 to 4000 cP, acid number from 0 to 1 and hydroxyl number between 100 and 250. This varnish resin can be employed in a solvent-free varnish wherein it is the sole resinous component or it can be employed in a varnish composition containing a second component such as an isocyanate and/or amine resin. The two-component system is also applicable without additional addition of solvents. In either event, the varnish resin composition usually contains a crosslinking agent of the known type.

DESCRIPTION OF SPECIFIC EMBODIMENTS

In accordance with this invention it is essential that the addition of the glycidyl ester not take place until the condensation of the polycarboxylic acid or its anhydride with the polyalcohol has been completed to such an extent that the condensate has the specified properties. This first step in the preparation of the resins can be performed by known methods such as by a fusion condensation process. The use of a fusion condensation process in step A of the process is preferred.

In conducting the condensation between the polycarboxylic acid or anhydride and the polyalcohol, the duration of condensation depends upon the size of the batch, the components used and the manner by which the temperature is regulated. The mol ratio of alcoholic component to acid will depend upon the number of carboxyl groups in the acid component and the number of hydroxyl groups in the alcoholic component. Generally speaking, the mol ratio of alcoholic component to acid component is at least about 1:1. Generally, it is in the range of 1:1.0 to 1:1.6, preferably between 1:1.1 to 1:1.4.

In general, however, the alcoholic component will be used in a slight molar excess in order to obtain the desired hydroxyl number in the intermediate condensate. This excess can be determined based upon the amount of the polyalcohol to be employed, or it can be determined experimentally beforehand. The greater the content of higher valency alcohols is in the alcohol component, the smaller this excess will be.

Generally speaking, the reaction temperature employed in the condensation of the polycarboxylic acid or anhydride with the polyalcohol depends upon the nature of the components involved. At the commencement of the condensation, the temperature is below the melting point of the individual components, and as the condensation reaction progresses, it is raised to levels between 200° and 260° C. Broadly speaking, the process can be carried out using a temperature during the initial condensation stage of between 50° and 260° C.

The order in which the individual components are introduced into the reaction vessel is not critical to the process of the invention. One can combine all of the components together in a single reaction vessel and then slowly heat the mixture. The reaction can also be carried out by introducing the alcohol component into a vessel, especially if it is an alcoholic component which is fluid at room temperature. The vessel is then heated to temperatures at which the esterification reaction will commence. When the temperature of the reaction mixture has reached an esterification temperature, the acid component is then introduced. The acid component can be introduced all at once or gradually over a period of time such as in portions. If an $\alpha,\beta$-dicarboxylic acid anhydride or other acid is used which sublimes or decomposes at temperatures above 400° C, it is advisable not to introduce these components until the condensation has advanced and to do so at a temperature below the decomposition or sublimation temperature of the compound and then to slowly increase the temperature.

The reaction generally takes place without the addition of a catalyst. However, known condensation catalysts such as, for example, titanic acid ester or other titanium compounds, toluenesulfonic acids, or other acid catalysts such as hydrochloric or sulfuric acid, can also be added.

The time at which the condensation reaction should be interrupted is determined experimentally by taking samples and testing them for acid number, hydroxyl number and viscosity. The acid number is to assume values between 10 and 80, preferably between 15 and 40. Values between 40 and 80 can be tolerated when the varnish prepared from the resin may have a higher viscosity combined with greater softness.

The hydroxyl number upon termination of the condensation is to be between 120 and 250, preferably between 120 and 180, and the viscosity is to have attained values between 50,000 and 180,000 cP, preferably 60 to 80,000 cP.

As soon as the resin has the specified characteristic values, it is allowed to cool to temperatures between 60° and 100° C. Then the glycidyl ester is added and the mixture is maintained at temperatures between 110° and 150° C, preferably 115° to 125° C, until the desired acid number has dropped to values under 1 and the viscosity is between 1000 and 4000 cP. Generally speaking, the introduction of the glycidyl ester into the reaction amounts containing the intermediate resin from the above-described condensation takes place between 1 and 15 minutes after the resultant resin has been obtained, preferably after it has been cooled to 80°-100° C.

The amount of glycidyl ester added is to be between 30 and 70% by weight, preferably between 40 and 60% by weight, with respect to the resin. The amount to be used in each case depends on the acid number of the condensate. The higher the acid number is, the greater the amount of glycidyl ester to be added will be. At least so much glycidyl ester must be added that the free carboxyl groups of the condensate will be able to react completely with the epoxy groups of the glycidyl ester. An excess above this amount is necessary for the achievement of a good varnish film, so that the excess epoxy groups of the finished resin will be able to react with the crosslinking agent. This excess can amount to as much as 100 mole-% in relation to the amount stoichiometrically necessary for the saturation of the free carboxyl groups of the condensate.

However, it is not necessary that all of this excess be incorporated by condensation. Some of it can be mixed with the finished resin after the condensation has been completely terminated. If this is done, a high-quality film is obtained in the crosslinking reaction. However, the baking loss will be 10 to 15% higher than it will be if the glycidyl ester is incorporated by condensation.

If, as in the preparation of the resin as described in Example 1, the carboxyl groups (acid number 20.5) were to be replaced by the stoichiometrically calculated amount of epoxy groups, only about 25 to 30% of the amount of glycidyl ester actually used would be needed for this resin content. Then, however, the crosslinking corresponding to Examples 3, 4 and 5 would not be sufficient for a good film quality (soft, not scratch resistant). If, however, in contrast to Examples 1 and 2, the excess of glycidyl esters is not incorporated by condensation but only admixed with the resins, films of high quality would also be obtained. The baking loss, however, will be around 10 to 12%, i.e., significantly higher than in the case of the resin in which the glycidyl ester excess is incorporated by condensation.

The glycidyl esters to be used correspond to the general formula

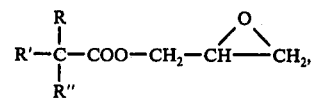

in which R, R' and R" are like or unlike saturated or unsaturated aliphatic alkyl radicals of 1 to 10 carbon atoms, preferably of 1 to 7 carbon atoms, the total number of the carbon atoms of the three radicals being between 4 and 30, preferably of 1 to 7 carbon atoms, the total number of the carbon atoms of the three radicals being between 4 and 30, preferably between 7 and 12. Aliphatic groups particularly contemplated include alkyl groups, alkenyl groups, alkynyl groups. These glycidyl esters are prepared in known manner by the reaction of epichlorhydrin with an alkali salt of the corresponding carboxylic acid. Examples of such carboxylic acids are the products known by the name of Versatic (911). Versatic (911) is a trademark for a mixture of cyclic and (mostly) tertiary acids containing 9-11 carbon atoms made by the action of carbon monoxide and water on refinery olefins with an acid catalyst. The acid is used in the manufacture of surface coatings, paint driers and alkyd plastics.

It is entirely unnecessary to use the glycidyl esters in pure form. One can employ commercially available glycidyl ester mixtures, especially those containing a predominant portion of one or more of the desired glycidyl esters. In these mixtures, one of the radicals R can be a hydrogen atom. However, the content of such esters in the mixture should preferably be less than 10% by weight.

In many cases it is also possible to use a larger content than 10 weight percent, up to 50% and more, of glycidyl esters of carboxylic acids having secondary or primary carbon atoms. Such glycidyl esters or their mixtures also display, depending on the nature of the polyester resin used, the action in accordance with the invention of reducing the viscosity and acid number to a more or less great extent.

The acid component to be used for the preparation of the unsaturated polyester resin includes both aliphatic, e.g., alkanoic, and aromatic dicarboxylic acids or their anhydrides. The aliphatic dicarboxylic acids include saturated, straight-chained or branched, and in some cases cyclic dicarboxylic acids or their anhydrides having 4 to 12 carbon atoms, examples being adipic acid, n-dodecanedicarboxylic acid, dimethylmalonic acid, hexahydrophthalic acid anhydride or succinic acid anhydride. Unsaturated aliphatic dicarboxylic acids or their anhydrides having preferably 2 to 5 carbon atoms can also be used, such as for example maleic acid, itaconic acid, and their isomers.

However, univalent or bivalent aromatic dicarboxylic acids or their anhydrides can also be used as the acid component, examples being phthalic acid anhydride, phthalic acid, isophthalic acid and tetrahydrophthalic acid anhydrides.

The alcohol component of the polyester resin includes both bivalent and polyvalent alcohols. Preferably, a mixture of bivalent and polyvalent alcohols is used, so that after condensation there is obtained a product having a hydroxyl number within the desired limits. Preferably, 50 to 75% by weight of the alcohols are bivalent alcohols.

The bivalent alcohols include saturated aliphatic, straight-chained or branched diols, e.g., alkanols, having 3 to 10 carbon atoms. Particularly contemplated alcohols include ethylene glycol, the propylene glycols, 1,3-butanediol, 1,4-butanediol, neopentyl glycol, hexane diols, and 2,2,4-trimethyl-1,3-pentanediol. Unsaturated diols are particularly contemplated including those having an alkanol chain wherein a pair of hydrogen atoms has been removed. A typical unsaturated diol contemplated is butene-2-diol-1,4.

Examples of trivalent and polyvalent alcohols are glycerine, trimethylolpropane or pentaerythritol. Ether alcohols can also be used, examples being diethylene glycol and triethylene glycol.

The resins of the invention are distinguished by an excellent stability in storage. After 6 months of storage at room temperature, the viscosity does not virtually change. Turbidity or precipitation are not visible, either.

The resins of the invention can be used in a known manner for the preparation of one-component and two-component varnish systems. The advantage of these varnish systems resides in the fact that they are virtually solvent-free and thus undergo little loss upon baking. These varnish systems consist of the resins of the invention and compounds containing either amines or isocyanate groups. After being baked onto metallic or other surfaces, they yield firmly adherent varnish films which are not only elastic but also have a high hardness.

Both aliphatic and aromatic isocyanates are suitable for the crosslinking of the resins of the invention in the making of varnish films. Aliphatic isocyanates, however, are preferred, since they do not produce any yellowing of the film.

In principle, any amine resin which can be used to harden previously known polyester varnish resins can be employed as an amine hardener for a varnish containing the varnish resin of this invention. Hence, there is contemplated the use of known amine hardening agents in the varnish composition of the invention. For this purpose, resins based upon hexamethoxymethylmelamine can be named as an example.

If the last-named resin is used simultaneously with polyfunctional aliphatic or fatty acid-modified isocyanates, such as, for example, the reaction products formed from hexamethylenediisocyanate or isophoronediisocyanate with mono-esters or diesters of polyols, e.g., trimethylolpropane, the resins of the invention can also be used as single-component varnish resins.

The bake-on varnishes prepared with the use of the resins of the invention are not only elastic but also hard-surfaced. A piece of sheet metal coated with a film of such varnish can be bent without cracking the film or causing it to spall off. Under optimum conditions, the elasticity is even so great that a varnish film baked onto a plastic sheet material such as polyvinyl chloride will remain firmly adherent thereto, even when the material is creased or crumpled.

Solubility

The resins of the invention are soluble in alcohols (ethanol, benzyl alcohol), aromatic hydrocarbons (toluene, solvent naphtha) and organic solvents (esters, glycol ethers and their esters, ketones, etc.); they are insoluble in aliphatic hydrocarbons.

Ethanol, butanol, toluene and xylene most greatly lower the viscosity, but their use should be avoided if possible because the wet films tend to form bubbles if heat is applied immediately. It has been found that butyl acetate very greatly reduces the viscosity and an immediate bake-on process can be provided using such solvent.

In order to more fully illustrate the instant invention and the manner of practicing the same the following examples are presented.

EXAMPLES

EXAMPLE 1

198 weight-parts of diethylene glycol, 226 weight-parts of butanediol-1,3, 217 weight-parts of neopentyl glycol and 228 weight-parts of trimethylolpropane were heated to 100° C within 45 minutes. Then 314 weight-parts of adipic acid and 318 weight-parts of phthalic acid anhydride were added to this mixture and it was heated to 130° C within 20 minutes. The melt was kept at this temperature for 30 to 35 minutes, and then heated in the course of about 2 hours to 240° C, then held at this temperature for 2 hours. Then it was cooled to 180° C, 105 weight-parts of maleic acid anhydride were added, and the mixture was heated within 30 minutes to 240° C.

After the melt had again reached a temperature of 240° C the heat was shut off. A specimen of the resin had an acid number of 20.5, a hydroxyl number of 125, and a viscosity of 163,000 cP. The mixture was cooled down to 85° C and at this temperature 855 weight-parts of a glycidyl ester of versatic acid 911 (commercially obtainable under the name "Cardura E") were added, whereupon further cooling to 65° C took place.

Then the mixture was heated over a period of 30 minutes to 120° C and held at this temperature for 60 minutes. The resin thus obtained had an acid number of 0.2, an OH number of 120, and a viscosity of 2,700 cP.

EXAMPLE 2

The same components as in Example 1 were reacted in the same quantity ratio. Only the temperature management was varied during the condensation in the following manner: After the addition of the acid component at 100° C to the polyol mixture, the temperature was raised over a period of 60 minutes to 145° C and was held at this level for 90 minutes. Over a period of 2½ hours, the temperature was slowly raised to 170° C, and in the course of another 135 minutes a temperature of 200° C was attained. After another 30 minutes, the final temperature of 240° C was attained, at which condensation was continued for one more hour.

Then the melt was cooled down to 180° C, maleic acid anhydride was added, and then the mixture was heated over a period of 50 minutes to 240° C. The resin then obtained had a viscosity of 66,000 cP, an acid number of 16.4 and an OH number of 207.

The further processing of this resin was analogous to that of Example 1. The end product also had a viscosity of 2,700 cP and an acid number of 0.2. The OH number was 165.

The resins of Examples 1 and 2, after five months of storage at normal temperature and at 4° C, gave no sign of turbidy or settling. They were compatible with conventional pigments (e.g., TiO$_2$) and could be worked with conventional grinding machines (e.g., pebble mills, roller mixers).

EXAMPLE 3

Two-Component Varnish 57 weight-parts of the resin prepared in accordance with Example 1 were worked with 43 weight-parts of titanium dioxide to form a pigment paste. 56.14 parts of this paste were mixed with 43.84 parts of a 75% solution of a triisocyanate based on hexamethylenediisocyanate (commercially obtainable under the name "Desmodur N" ®) and 0.02 parts of dibutyl tin dilaurate as catalyst, to form a varnish having a pot life of about 6 hours.

This varnish was applied with a 150-micron doctor to untreated deep-drawing steel sheets and hardened at 120° C for 30 minutes. The properties of the film are shown in Table 1.

EXAMPLE 4

Two-Component Varnish 85.48 parts of the pigment paste of Example 3 were made into a varnish with 11 parts of a resin based on hexamethoxymethylmelamine (commercially obtainable under the names "Maprenal WL" or "Cymel 300"), 3.5 parts of a 10% solution of p-toluenesulfonic acid in benzyl alcohol, and 0.02 parts of dibutyl tin laurate. The shelf life of this varnish was about 3 months.

The varnish was applied to a steel sheet as in Example 3. The characteristics are given in Table 1.

EXAMPLE 5

One-Component Varnishes 80 parts of the pigment paste of Example 3 were made into a varnish with 8.7 parts of the hexamethoxymethylmelamine resin described in Example 4 and 9.1 parts of a polyfunctional aliphatic isocyanate (commercially obtainable under the name "Desmodur ®" Z 4167, approximately 67% solution in a mixture of equal parts of ethyl glycol and xylene) or of a polyfunctional, fatty acid-modified isocyanate (commercially: "Desmodur ®" Z 4273, approximately 73% solution in xylene) with the addition of 2.15 parts of a 10% solution of p-toluenesulfonic acid in butyl acetate, and 0.05 parts of a zinc octoate solution containing 8% zinc, determined as the metal.

This varnish had a virtually unlimited shelf life and could be used as a one-component varnish. It was also suitable for the dipping method of application. To improve the leveling and gloss of this varnish, a known modified siloxane can be added in amounts of 0.2 to 0.5 weight percent.

The varnish was applied to a steel sheet by means of a 150-μ doctor blade. The properties of the film obtained are shown in Table 1.

In use, approximate bake-on temperatures, preferably around 120° C to 130° C, for a period of e.g. 30 minutes, are employed. Wet films of this kind can be immediately subjected, without preliminary air-drying, to the above-given temperatures without bubbling, disturbances of the film surface, or the like. In any case, low-boiling solvents such as ethanol, butanol, xylene and the like must not be used. If butyl acetate is used, however, one can place the wet film immediately into the oven.

The baking loss of the varnishes described, after subtracting for the solvent in the additives, is approximately 5%.

The viscosity of the varnish mixture described in Example 5 (4.75 wt.-parts solvent in the additives) is approximately 180 seconds, measured according to DIN 53,211. The addition of about 7–8% solvent (butyl acetate) reduces it to 30–50 seconds, depending on the hexamethoxymethylmelamine resins used.

Table 1

| | Examples | | |
|---|---|---|---|
| | 3 | 4 | 5 |
| Erichsen cupping test per DIN 53156 (in mm) | 9.0 | >8.0 | 10.0 |
| Pendulum hardness test per DIN 53157 | 80 | 85 | 100 |
| Impression hardness test per DIN 53153 | 77 | 80 | 90 |
| Gloss (according to Lange) | 100 | >100 | >100 |
| Criss-cross slash test (DIN 53151) | O - I | O - I | O |
| Scratch resistance | i.O. | i.O. | i.O. |

What is claimed is:

1. A process for preparing a varnish resin having a viscosity of 1,000 to 4,000 cP, an acid number from 0 to 1 and a hydroxyl number between 100 and 250 which comprises:
   A. condensing at 50° to 260° C a polycarboxylic acid or anhydride with an alcohol until a resin is formed having an acid number between 10 and 80 a hydroxyl number of 120–250 and a viscosity between 30,000 and 180,000 cP; and
   B. thereafter adjusting the temperature thereof to 80°–100° C and adding to the resultant resin a glycidyl ester of a saturated aliphatic carboxylic acid having 10 to 30 carbon atoms in an amount of 30 to 70% by weight based upon the weight of the resin obtained in step A and condensing the glycidyl ester with the resin from step A at a temperature of 110 to 150° C until the acid number of the resin in between 0 and 1 and the resin has a viscosity of 1000 to 4000 cP.

2. A process according to claim 1 wherein in step A a mixture of bivalent and higher valent saturated alcohols are employed of which 50 to 75 weight percent comprise bivalent alcohols.

3. A process according to claim 1 wherein the glycidyl ester of step B is added in at least a stoichiometric amount, based upon the number of carboxyl groups in the resin.

4. A process according to claim 3 wherein the glycidyl ester in step B is added in a molar excess, based upon the number of carboxyl groups in the resin.

5. A process according to claim 4 wherein the glycidyl ester is added in the amount up to 100 mol % excess.

6. A process according to claim 3 wherein said glycidyl ester is added to the resultant resin following step B.

7. A process according to claim 1 wherein the glycidyl ester has the formula

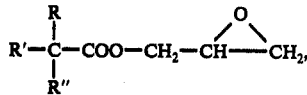

wherein R, R' and R" are independently hydrogen or a saturated or unsaturated aliphatic alkyl group of 1 to 10 carbon atoms.

8. A process according to claim 7 wherein the number of glycidyl esters wherein R, R' or R" is hydrogen is less than 10% based upon the number of glycidyl esters employed.

9. A process according to claim 7 wherein the glycidyl ester is the ester of a mixture of cyclic and tertiary $C_9$-$C_{11}$ acids.

10. A process according to claim 7 wherein the acid or anhydride of step A is selected from the group consisting of straight or branch chained aliphatic saturated dicarboxylic acids or anhydrides, $C_4$-$C_{12}$ cyclic dicarboxylic acids and anhydrides, branched or unbranched unsaturated $C_2$-$C_5$ aliphatic dicarboxylic acids or their anhydrides and aromatic dicarboxylic acids or their anhydrides.

11. A process according to claim 10 wherein said acid or anhydride is selected from the group consisting of adipic acid or its anhydride, n-dodecanedicarboxylic acid or its anhydride, dimethylmalonic acid or its anhydride, hexahydrophthalic acid or its anhydride, succinic acid or its anhydride, maleic acid or its anhydride, itaconic acid or its anhydride, phthalic acid anhydride, phthalic acid, isophthalic acid and its anhydride and tetrahydrophthalic acid and its anhydride.

12. A process according to claim 10 wherein said alcohol is a trivalent alcohol or an aliphatic bivalent straight or branch chained diol having 3 to 10 carbon atoms.

13. A process according to claim 12 wherein said alcohol is selected from the group consisting of ethylene glycol, a propylene glycol, 1,3-butanediol, 1,4-butanediol, neopentyl glycol, a hexane diol, 2,2,4-trimethyl-1,3-pentanediol, butene-2-diol-1,4, glycerine, trimethylolpropane and pentaerythritol.

14. A varnish composition consisting essentially of an epoxy modified polyester resin having a viscosity of 1000 to 4000 cP, an acid number from 0 to 1, and a hydroxyl number between 100 and 250 and a crosslinking agent, said resin prepared by the process of claim 1.

15. A resin comprising a resin having a viscosity of 1000 to 4000 cP, an acid number from 0 to 1, and a hydroxyl number between 100 and 250 prepared by the process of claim 1.

16. A resin comprising a resin having a viscosity of 1000 to 4000 cP, an acid number from 0 to 1, and a hydroxyl number between 100 and 250 prepared by the process of claim 2.

17. A resin comprising a resin having a viscosity of 1000 to 4000 cP, an acid number from 0 to 1, and a hydroxyl number between 100 and 250 prepared by the process of claim 7.

18. A resin comprising a resin having a viscosity of 1000 to 4000 cP, an acid number from 0 to 1, and a hydroxyl number between 100 and 250 prepared by the process of claim 13.

* * * * *